United States Patent
Poorman et al.

(10) Patent No.: US 7,196,866 B2
(45) Date of Patent: Mar. 27, 2007

(54) INTERCONNECT STRUCTURE HAVING MULTIPLE LAYERS OF TRACES FOR ELECTRICAL CONNECTION TO A TAPE HEAD ASSEMBLY

(75) Inventors: Paul W. Poorman, Meridian, ID (US); Ralph F. Simmons, Jr., Boise, ID (US); Lawrence A. Hansen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 10/737,938

(22) Filed: Dec. 17, 2003

(65) Prior Publication Data

US 2005/0134999 A1  Jun. 23, 2005

(51) Int. Cl.
G11B 5/008 (2006.01)

(52) U.S. Cl. ............ 360/90; 360/121; 360/128
(58) Field of Classification Search ............ 360/128, 360/90, 121
See application file for complete search history.

(56) References Cited

U.S. PATENT DOCUMENTS

| | | | |
|---|---|---|---|
| 4,616,279 A | 10/1986 | Poorman | 360/244.1 |
| 5,142,422 A | 8/1992 | Zook et al. | 360/54 |
| 5,287,478 A | 2/1994 | Johnston et al. | 711/111 |
| 5,406,425 A | 4/1995 | Johnston et al. | 360/48 |
| 5,541,793 A * | 7/1996 | Schwarz | 360/121 |
| 5,995,328 A * | 11/1999 | Balakrishnan | 360/245.9 |
| 6,018,444 A | 1/2000 | Beck et al. | 360/121 |
| 6,055,117 A | 4/2000 | Hansen et al. | 360/45 |
| 6,078,483 A | 6/2000 | Anderson | 360/261.1 |
| 6,388,836 B2 | 5/2002 | Anderson et al. | 360/128 |
| 6,424,499 B1 * | 7/2002 | Balakrishnan et al. | 360/245.9 |
| 6,471,415 B1 | 10/2002 | Poorman | 385/59 |
| 6,508,750 B1 | 1/2003 | Poorman | 492/35 |
| 6,522,499 B1 * | 2/2003 | Takayama et al. | 360/129 |
| 6,570,738 B1 * | 5/2003 | McKinstry | 360/121 |
| 6,700,751 B2 * | 3/2004 | Ajiki et al. | 360/316 |

OTHER PUBLICATIONS

IBM, "IBM Introduces New Enterprise-Class Storage Solutions for Medium-Sized Companies," pp. 1-3, printed from http://www.storage.ibm.com (Feb. 18, 2003).
IBM, "IBM TotalStorage Ultrium External Tape Drive 3580 featuring Ultrium 2 drives," 2 pages (Jan. 2003).
IBM, "Ultrium External Tape Drive," 2 pages (Sep. 2002).
IBM, "Ultrium LTO," pp. 1-3, printed from http://www.storage.ibm.com (1998).
Hewlett-Packard, "HP Ultrium Tape Products Range," 10 pages (1999).
Seagate, "Linear, Tape-Open (LTO) Technology," pp. 1-5 (1998).

* cited by examiner

Primary Examiner—Jefferson Evans

(57) ABSTRACT

An apparatus and method for electrically coupling read elements and write elements of a tape head assembly to another component includes an interconnect structure having plural layers of traces, with the traces comprising write traces electrically connected to respective write elements, and read traces electrically connected to respective read elements. The write traces and read traces are interleaved across a dimension of the interconnect structure.

22 Claims, 4 Drawing Sheets

INTERCONNECT STRUCTURE HAVING MULTIPLE LAYERS OF TRACES FOR ELECTRICAL CONNECTION TO A TAPE HEAD ASSEMBLY

BACKGROUND

A widely used storage medium for storing information is storage tape, such as magnetic tape. Storage tapes can be mounted in various types of tape cassettes or cartridges. One type of tape cassette or cartridge is a two-reel or two-spindle cassette or cartridge in which the tape is housed entirely within the cassette or cartridge. One end of the tape is attached to a first reel, while another end of the tape is attached to a second reel. The cassette or cartridge is loaded into a tape drive, which includes a tape head that engages the tape to read data from or record data to the tape as the tape is wound from one reel to the other in the tape cassette or cartridge.

Alternatively, a single-reel or single-spindle tape cartridge can be used in which the cartridge has one reel or spindle. In a single-reel design, the source reel is located in the tape cartridge, but a take-up reel is located outside the cartridge in the tape drive. When the single-reel cartridge is loaded into the tape drive, an end of the tape is removed from the cartridge and loaded onto the take-up reel of the tape drive.

To achieve increased data transfer rates, some tape drives employ tape head assemblies having multiple channels of read and write elements. The multiple channels of write elements are capable of recording to multiple data tracks of the tape simultaneously, and the multiple channels of read elements are capable of reading from multiple data tracks of the tape simultaneously.

Typically, a flexible circuit is used to route traces that electrically connect read and write elements of the tape head assembly to respective read and write circuitry mounted elsewhere in a tape drive, such as on a circuit board. A conventional flexible circuit contains a single layer of read and write traces. With multi-channel tape head assemblies, a relatively large number of traces are routed through the single-layer flexible circuit. Conventionally, according to one example, the distance between vertical centerlines of adjacent traces can be no closer than 150 micrometers (μm). This spacing leads to relatively high inductance in the traces. The high inductance results in high impedance, which reduces the ability to achieve fast rise times for signals (especially write signals) transmitted over the traces.

DETAILED DESCRIPTION

Figure 1:
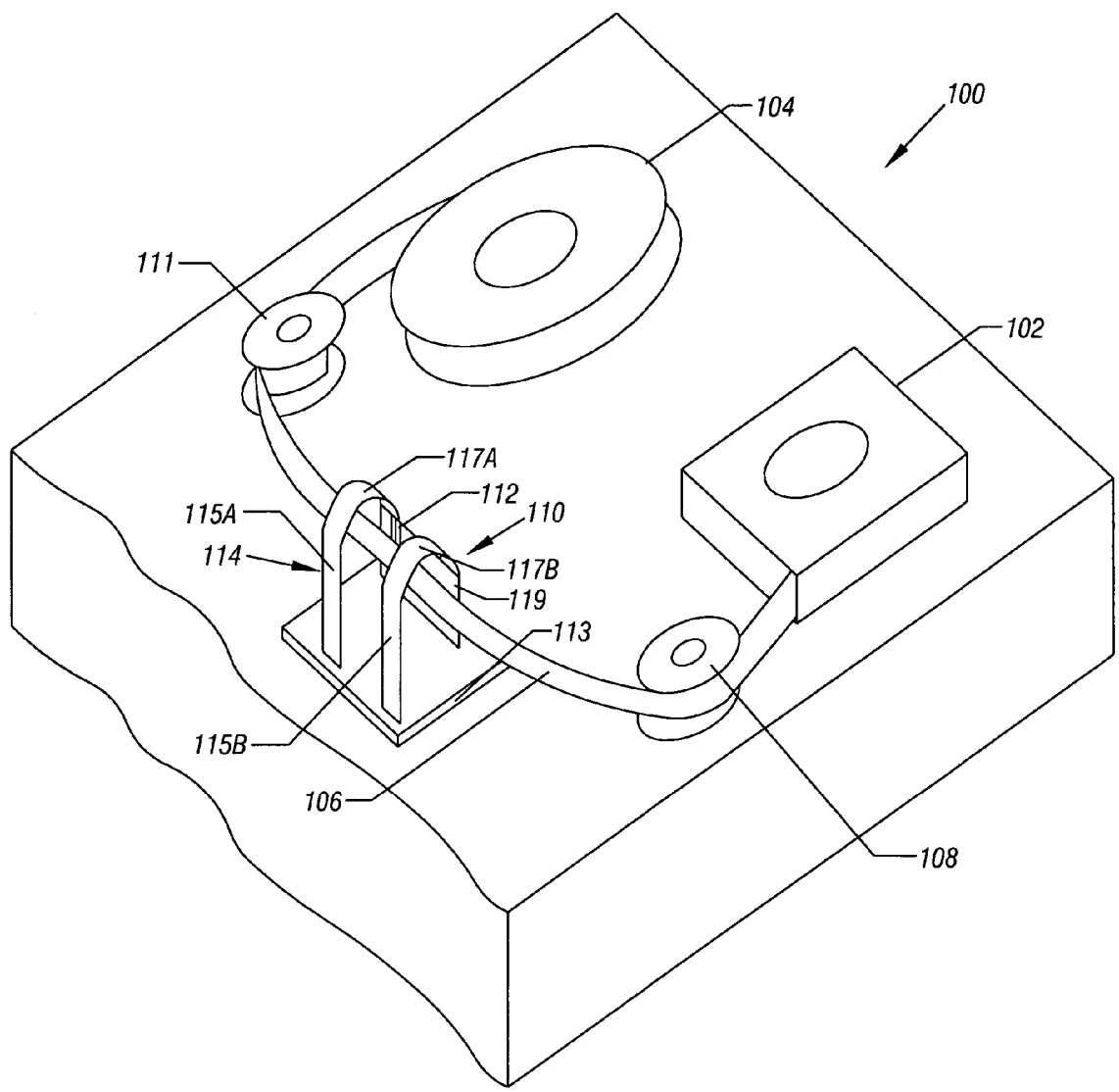
FIG. 1 is a perspective view of a tape drive incorporating a tape head assembly according to one embodiment.

FIG. 1 illustrates an example tape drive 100 that incorporates a tape head assembly 110 according to some embodiments. The tape drive 100 is capable of receiving a cartridge 102, which in one example implementation is a single-reel cartridge. However, in other embodiments, other types of tape cartridges or cassettes can be used. Once the cartridge 102 is loaded in the tape drive 100, a tape 106 is pulled by a picker (not shown) in the tape drive from the cartridge 102. The tape 106 is provided around a tape guide 108, through the tape head assembly 110, and around tape guide 111 to a take-up reel 104 in the tape drive 100.

The tape head assembly 110 includes a transducer head 112 and an interconnect structure 114 that routes electrically conductive traces from the transducer head 112 to read and write circuitry on a circuit board 113. The transducer head 112 includes read and write elements, and the interconnect structure 114 includes read and write traces to electrically connect the read and write elements, respectively, to circuitry on the circuit board 113.

In accordance with some embodiments of the invention, the interconnect structure 114 is a flexible circuit having multiple layers of read and write traces. The provision of multiple layers (rather than a single layer) enables closer spacing between trace pairs without bridging or shorting. A "trace pair" refers to a pair of read traces, a pair of write traces, or a pair that includes a read trace and a write trace. Reduced spacing between trace pairs is associated with reduced inductance, which leads to reduced impedance seen by signals carried by the traces. The lowered impedance allows for faster rise times of signals over such traces, such as write signals routed over write traces.

As depicted in FIG. 1, the interconnect structure 114 includes two spaced apart legs 115A and 115B that extend generally vertically. The two legs 115A and 115B are integrally connected to respective rolling loop sections 117A and 117B, which are further connected to a rear section 119 of the interconnect structure 114. The tape 106 from the cartridge 102 extends through the tape head assembly 110 in the space between the legs 115A, 115B and the rear section 119.

Figure 2:
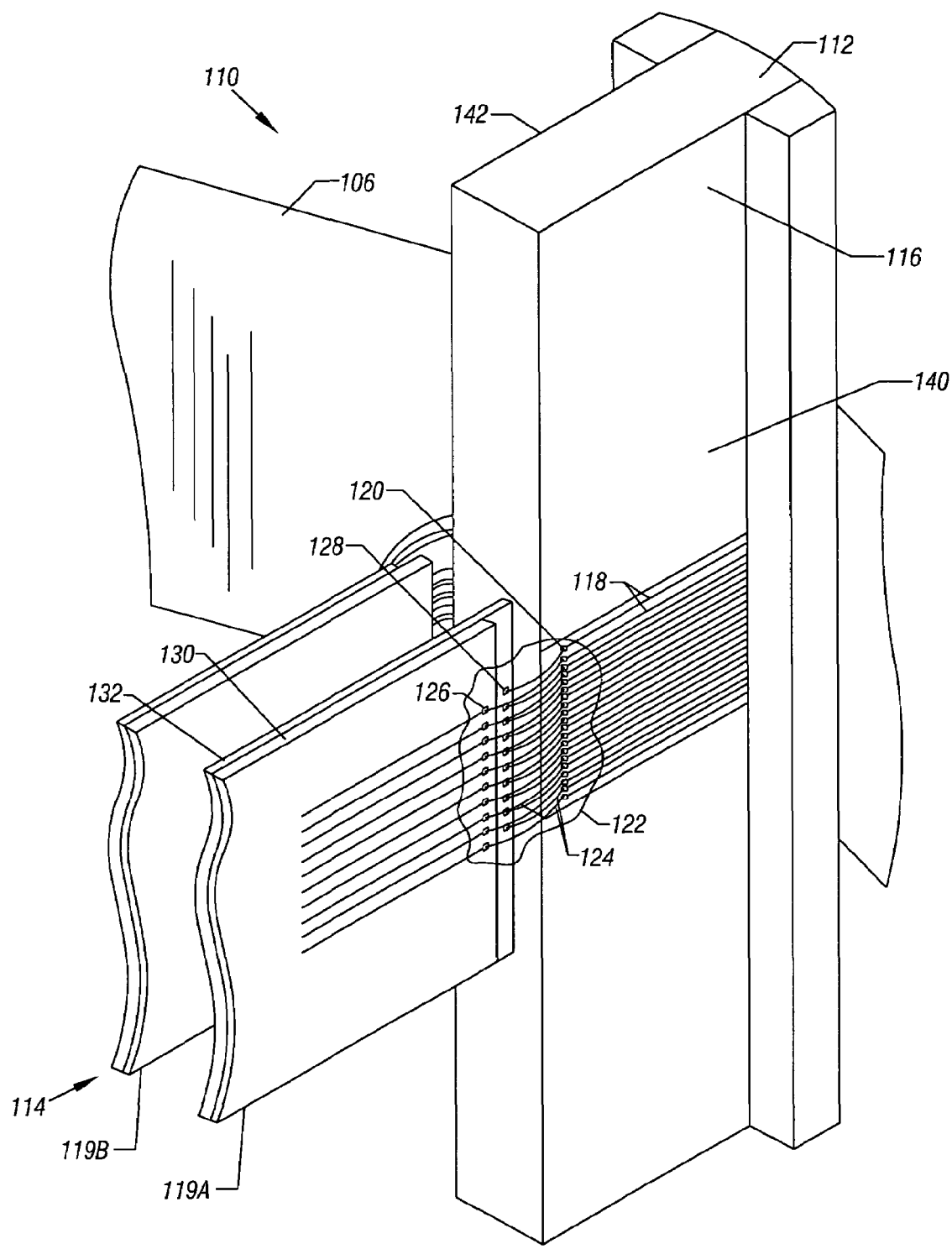
FIG. 2 is a rear perspective view of a portion of the tape head assembly with a multi-layered interconnect structure according to one embodiment for electrically connecting read and write elements of the tape head assembly to other circuitry.

A rear perspective view of a portion of the tape head assembly 110 is shown in FIG. 2. The transducer head 112 includes a thin film wafer 116 on which are formed read and write elements (not shown) for reading from or writing to tape 106 as the tape 106 passes by the transducer head 112. In one implementation, the two-terminal read elements include magnetically sensitive thin-film magnetoresistive elements, and the two-terminal write elements include thin-film inductive elements. A plurality of conductors or traces 118, also formed on the thin film wafer 116, electically connect the read and write elements to a set of bond pads 120. Bond wires 124 electrically connect the bond pads 120 (on the thin film wafer 116) with respective bond pads 126 and 128 that are formed in layers 130 and 132, respectively, of the multi-layered interconnect structure 114. A protective material 122 is provided over the bond wires 124 and bond pads 120, 126, and 128 to protect these elements. The protective material 122 is an electrically insulating material.

Each of the layers 130 and 132 of the interconnect structure 114 includes traces that electrically connect to respective ones of the bond pads 126 and 128. Such traces are routed through the interconnect structure 114 to the circuit board 113 (FIG. 1).

The traces 118, bond pads 120, bond wires 124, and bond pads 126 and 128 are provided on a first side 140 of the transducer head 112. The same elements are repeated on the other side 142 of the transducer head 112 to increase the number of traces that can be routed from the transducer head 112 to the circuit board 113. The traces 118, bond wires 124, and bond pads 120, 126, and 128 on the first side 140 are electrically connected to traces routed through a first portion 119A of the interconnect structure 114. The traces, bond wires, and bond pads repeated on the second side 142 are electrically connected to traces running through a second portion 119B of the interconnect structure 114. The traces routed through the first portion 119A extend through one of the legs 115A and 115B (FIG. 1) of the interconnect structure 114, while the traces routed through the second portion 119B extend through the other one of the legs 115A and 115B.

Figure 3:
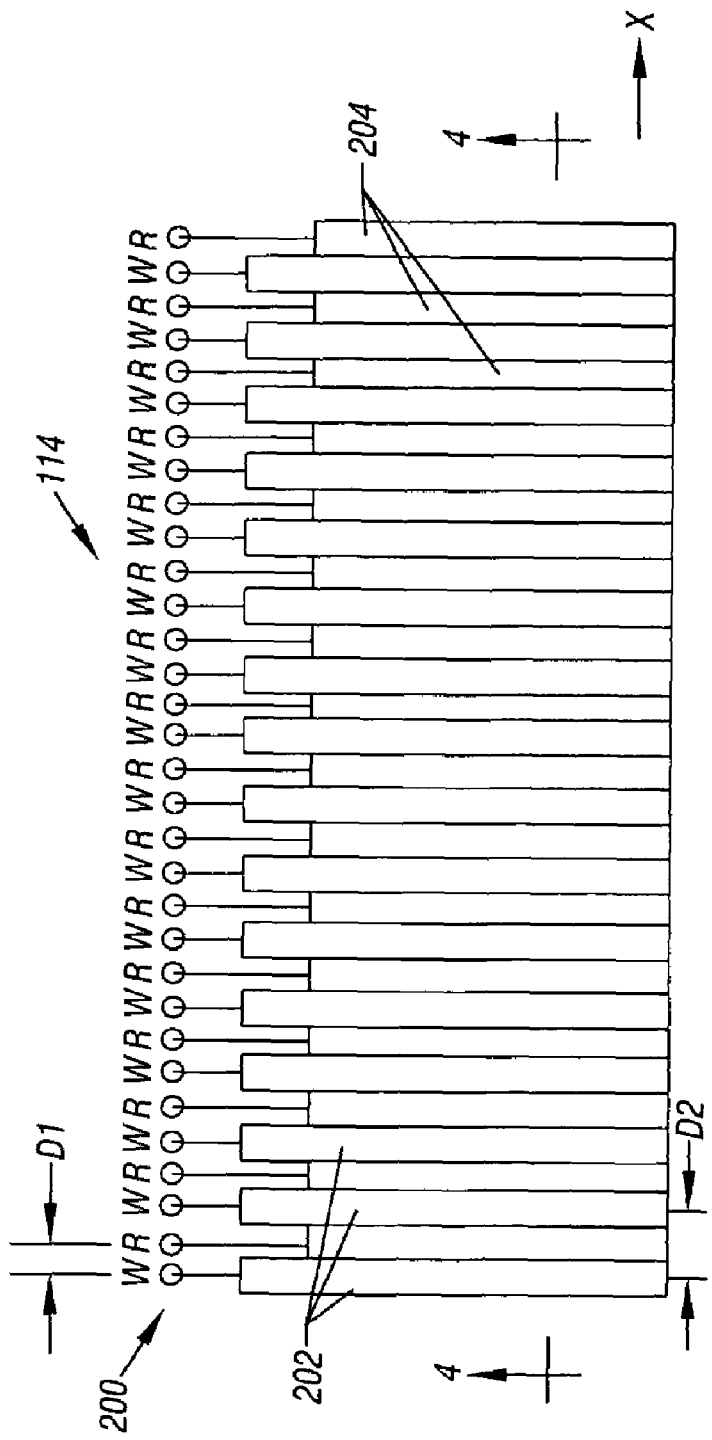
FIG. 3 illustrates the layout of read and write traces in a multi-layered interconnect structure according to one embodiment of the invention.
Figure 4:
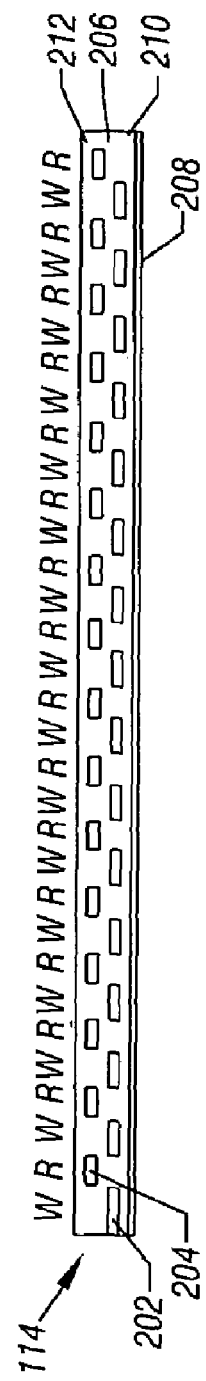
FIG. 4 is a cross-sectional view of the multi-layered interconnect structure of FIG. 3.

FIGS. 3 and 4 illustrate a first arrangement of read and write traces (write traces 202 and read traces 204) in the interconnect structure 114. In this arrangement, the read traces 204 are provided in a first layer (one of layers 130 and 132 depicted in FIG. 2) of the interconnect structure 114, while the write traces are provided in a second layer (the other one of layers 130 and 132 depicted in FIG. 2) of the interconnect structure 114. In the view of the FIG. 4, the read traces 204 are arranged in a layer above the layer containing the write traces 202. The write and read traces 202 an 204 are electrically connected to bond pads 200 (which correspond to the bond pads 126 and 128 shown in FIG. 2).

As shown in FIG. 4, the interconnect layer 114 also include a ground shield layer 208 to provide electromagnetic interference (EMI) shielding. The ground shield layer 208 is a planar layer of electrically conductive material that is electrically connected to a ground potential. The ground plane layer 208 reduces radiated emissions from the interconnect structure 114 during read and write operations when signals having relatively high frequencies are transmitted over the read traces 204 and write traces 202.

By arranging the read and write traces in different layers, as depicted in FIGS. 3 and 4, the write traces 202 and read traces 204 are interleaved with respect to each other across a dimension X (which is generally parallel to a main surface of the interconnect structure). Read and write traces being interleaved with respect to each other across a first dimension refers to alternating placement of the read and write traces across the first dimension. The read and write traces extend along a second dimension that is generally perpendicular to the first dimension. Thus, an example of an interleaved arrangement of read and write traces is as follows: at least one read trace placed at a first location, at least one write trace placed at a second location adjacent the first location, at least one read trace placed at a third location adjacent the second location, and so forth. In the arrangement of FIGS. 3 and 4, the interleaved arrangement of write traces (referred to as "W") and read traces (referred to as "R") across dimension X is as follows: W, R, W, R, W, R, etc.

Another example of an interleaved arrangement of write traces (W) and read traces (R) is the following: W, W, R, R, W, W, R, R, etc. Yet another example of an interleaved arrangement of write traces and read traces is as follows: W, R, R, W, W, W, R, W, R, etc. Thus, any arrangement of write and read traces in which at least one write trace is located between two read traces, or in which at least one read trace is located between two write traces, is an interleaved arrangement.

In addition, by providing the write and read traces in plural layers of the interconnect structure 114, the distance (labeled D1 in FIG. 3) between the vertical centerline of a write trace 202 and the vertical centerline of a read trace 204 can be less than the minimum distance specified between adjacent traces on the same layer. In one example implementation, the distance D1 between the vertical centerline of the write trace 202 and the vertical centerline of the read trace 204 is about 100 micrometers (μm). More generally, according to some implementations, the distance D1 between traces can be less than about 150 μm. This is contrasted to the distance D2 between adjacent write traces 202, which in one example implementation is about 200 μm. The same distance D2 is specified between read traces 204 in the other layer of the interconnect structure 114.

The reduced distance D1 between adjacent write and read traces 202 and 204 reduces the inductance of each of the traces 202 and 204, which leads to reduced impedance seen by signals transmitted over the write traces 202 and read traces 204. As a result, faster rise times of such signals can be achieved.

To form the interconnect structure 114 depicted in FIG. 4, in accordance with one embodiment, electrically conductive foils are laminated to both sides of a layer (206) of insulating material (e.g., Kaptons® or other insulating material). Portions of the electrically conductive foils are etched to form the write traces 202 and read traces 204. Following formation of the write traces 202 and read traces 204, insulating layers 210 and 212 are laminated to both sides of the assembly including the insulating layer 206 and the layers including the write and read traces. Next, a laminated assembly having an electrically conductive foil making up the ground shield layer 208 and an insulating layer is bonded to one side of the assembly including the insulating layers 206, 210, and 212 and write and read trace layers. This process forms the structure depicted in FIG. 4.

As shown in FIG. 4, the write traces 202 and read traces 204 are interleaved with respect to each other such that each read trace 204 is vertically aligned with a gap between write traces 202. Similarly, each write trace 202 is vertically aligned with a gap between read traces 204.

Figure 5:
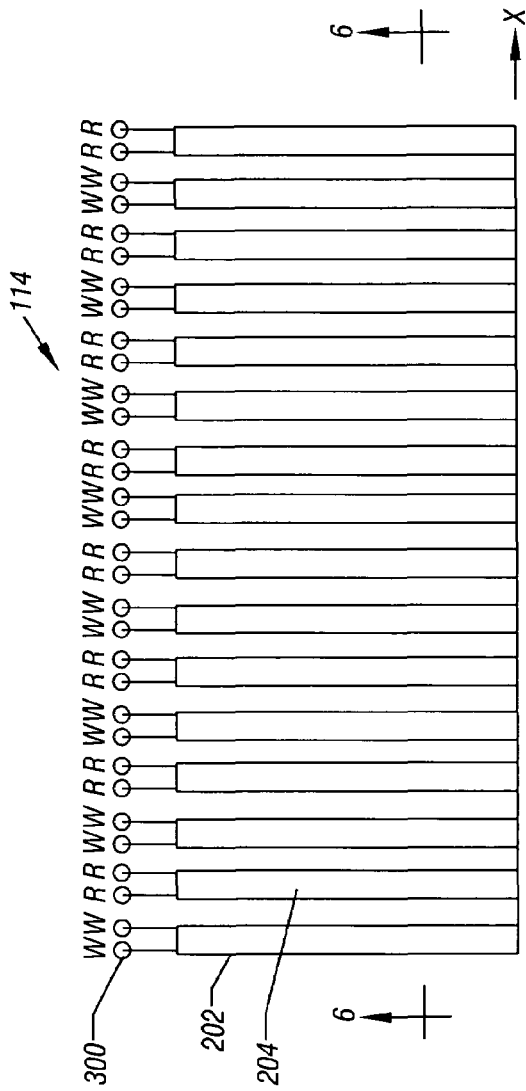
FIG. 5 illustrates the layout of read and write traces in a multi-layered interconnect structure according to another embodiment of the invention.
Figure 6:
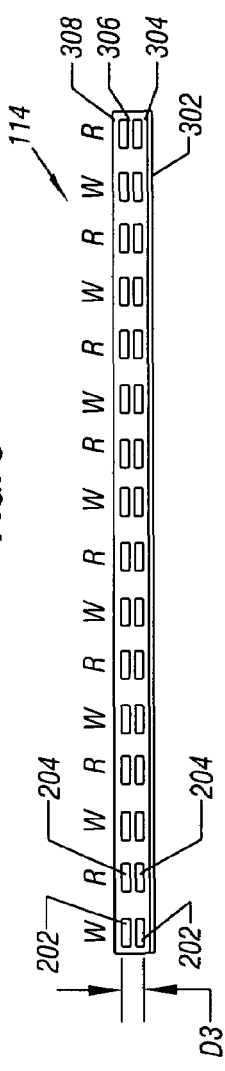
FIG. 6 is a cross-sectional view of the multi-layered interconnect structure of FIG. 5.

FIGS. 5 and 6 illustrate a different arrangement of write traces and read traces. In the arrangement of FIGS. 5 and 6, write traces 202 are stacked one on top of the other in the different layers of the interconnect structure 114. Similarly, the read traces 204 are stacked one on top of the other in the different layers of the interconnect structure 114. In this arrangement, the write and read traces are also interleaved across the dimension X of the interconnect structure 114. The write traces 202 and read traces 204 are connected to bond pads 300, which correspond to bond pads 126 and 128 shown in FIG. 2.

In the arrangement of FIGS. 5 and 6, a pair of stacked write traces 202 are provided adjacent a pair of stacked read traces 204. As shown in FIG. 6, a vertical distance between the horizontal centerlines of the stacked write traces 202 or stacked read traces 204 is about 42 μm (according to one example). Due to the close spacing of the write traces 202 from each other, the inductance seen by each write trace 202 is reduced. The same is also true of the closely spaced read traces. Although the capacitance between the two write traces 202 (in between the two stacked read traces 204) is increased due to the broad side coupling of the stacked write traces 202 and stacked read traces 204, the reduction in inductance of the traces still enables reduced impedance experienced by signals transmitted over the write and read traces.

A ground shield layer 302 is provided in the arrangement shown in FIGS. 5 and 6 to provide EMI shielding. Insulating layers 304, 306, and 308 provide insulation among the ground shield layer 302, write traces 202, and read traces 204.

The interconnect structure 114 depicted in FIG. 6 is formed in a manner similar to the structure of FIG. 4, discussed above.

Figure 7:
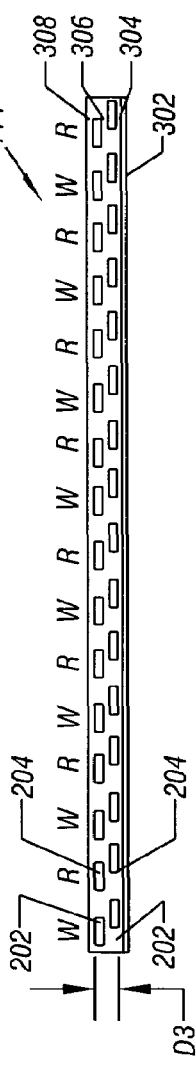
FIG. 7 is a cross-sectional view of yet another embodiment of a multi-layered interconnect structure.

To further adjust the inductance and/or capacitance of the traces 202 and 204, the arrangement depicted in FIGS. 5 and 6 can be modified by shifting each pair of stacked traces 202 or 204 such that the pair of traces do not overlap completely, as depicted in FIG. 7. In the arrangement of FIG. 6, the vertical centerlines of the write traces 302 in each pair of stacked write traces are aligned to provide complete overlap of the write traces in the pair. Similarly, the vertical centerlines of the read traces 204 in each pair of stacked read traces are aligned. However, in the FIG. 7 arrangement, the vertical centerlines of the write traces in each stacked pair are offset from each other, as are the vertical centerlines of the read traces in each stacked pair of read traces.

Shifting each pair of traces 202 or 204 such that there is partial overlap (rather than complete overlap) causes the inductance to rise, but the capacitance to decrease. This in turn changes the impedance seen by signals transmitted over the traces 202 or 204. The manufacturer of the tape head assembly 110 (FIG. 1) can thus control the impedance seen by signals transmitted over the read and write traces.

To further adjust the impedance of the traces 202 and 204, the insulating layers shown in FIGS. 4, 6, and 7 can be formed of a high permeability material, such as ferrite or ferrite-impregnated plastic. Any other high permeability, insulating material that maintains high permeability at high frequencies can also be used. The presence of the high permeability, insulating layers reduces both the inductance and capacitance of each trace.

The distance of the ground shield layer (208 in FIG. 4 and 302 in FIG. 6 or 7) from the adjacent layer of traces (202 and/or 204) can also be adjusted to reduce the inductive effect of the ground shield layer on the adjacent traces. For example, the ground shield layer (208 in FIG. 4 and 302 in FIG. 6 or 7) can be spaced up to 75 μm from the adjacent traces, while still maintaining adequate noise shielding properties. The ground shield layer can also be made of a high-permeability conductive material to reduce inductance.

In the foregoing description, numerous details are set forth to provide an understanding of the present invention. However, it will be understood by those skilled in the art that the present invention may be practiced without these details. While the invention has been disclosed with respect to a number of embodiments, those skilled in the art will appreciate numerous modifications and variations therefrom. It is intended that the appended claims cover such modifications and variations as fall within the true spirit and scope of the invention.

What is claimed is:

1. An apparatus for electrically coupling a transducer head of a tape head assembly to another component, comprising:
an interconnect structure including a flexible circuit that has plural layers of traces, the plural layers of traces comprising write traces to carry write signals, and read traces to carry read signals,
wherein the write traces are interleaved with respect to the read traces across a dimension of the interconnect structure such that the read traces are positioned over a gap between two write traces and the write traces are positioned over a gap between two read traces.

2. The apparatus of claim 1, wherein the write traces comprise plural pairs of write traces to carry respective write differential signals, and the read traces comprise plural pairs of read traces to carry respective read differential signals.

3. The apparatus of claim 2, wherein interleaving of the write traces and read traces enables for reduced distance between adjacent write traces in each write trace pair, and for reduced distance between adjacent read traces in each read trace pair.

4. The apparatus of claim 1, wherein the read and write traces are stacked in different layers.

5. An apparatus for electrically coupling a transducer head of a tape head assembly to another component, comprising:
an interconnect structure having plural layers of traces, the plural layers of traces comprising write traces to carry write signals, and read traces to carry read signals,
wherein the write traces are interleaved with respect to the read traces across a dimension of the interconnect structure and the write traces are provided in a first one of the layers, and the read traces are provided in a second one of the layers.

6. An apparatus for electrically coupling a transducer head of a tape head assembly to another component, comprising:
an interconnect structure including a flexible circuit that has plural layers of traces, the plural layers of traces comprising write traces to carry write signals, and read traces to carry read signals,
wherein the write traces are interleaved with respect to the read traces across a dimension of the interconnect structure,
wherein the write traces comprise pairs of write traces, each pair of write traces comprising one write trace in one layer stacked over another write trace in another layer, and
wherein the read traces comprise pairs of read traces, each pair of read traces comprising one read trace in one layer stacked over another read trace in another layer.

7. The apparatus of claim 6, wherein, in each pair of write traces, centerlines of the write traces in the pair are aligned.

8. The apparatus of claim 6, wherein, in each pair of write traces, centerlines of the write traces in the pair are offset such that one write trace in the pair partially overlaps another write trace in the pair.

9. The apparatus of claim 6, wherein, in each pair of read traces, centerlines of the read traces in the pair are aligned.

10. The apparatus of claim 6, wherein, in each pair of read traces, centerlines of the read traces in the pair are offset such that one read trace in the pair partially overlaps another read trace in the pair.

11. A tape drive, comprising:
a tape head assembly; and
elements to guide a tape from a cartridge through the tape head assembly,
wherein the tape head assembly comprises:
a transducer head to read data from and record data to the tape, and
an interconnect structure having plural layers of traces electrically connected to the transducer head, the plural layers of traces comprising read traces and write traces, the write trace being provided in a first one of the layers and the read traces being provided in a second one of the layers, wherein the read and write traces have at least one of the following arrangements: an arrangement of read and write traces across a dimension of the interconnect structure where at least one read trace is provided between two write traces; and an arrangement of read and write traces across the dimension of the interconnect structure where at least one write trace is provided between two read traces.

12. The tape drive of claim 11, further comprising first traces to electrically connect the read and write elements of the transducer head to the interconnect structure.

13. The tape drive of claim 12, further comprising bond pads on the interconnect structure, the first traces electrically connected to the bond pads, and the read and write traces electrically connected to the bond pads.

14. The tape drive of claim 12, wherein the tape head assembly further comprises a thin film wafer on which the transducer head is mounted, the first traces routed over the thin film wafer.

15. The tape drive of claim 11, wherein the interconnect structure has a ground shield layer, the ground shield layer separate from the layers containing the read and write traces.

16. The tape drive of claim 11, wherein the interconnect structure comprises a flexible circuit.

17. The tape drive of claim 11, wherein the interconnect structure has an insulating layer between the plural layers, the insulating layer formed of a high permeability material.

18. The tape drive of claim 17, wherein the high permeability material comprises one of ferrite and ferrite-impregnated plastic.

19. A method comprising:
providing a tape cartridge in a tape drive comprising a tape head assembly having a transducer;
reading data from and recording data to a tape of the tape cartridge with the transducer head; and
transmitting read signals and write signals over respective read traces and write traces in an interconnect structure having plural layers of read traces and write traces, the read traces and write traces arranged in an interleaved arrangement, wherein transmitting the write signals comprises transmitting differential write signals over respective pairs of write traces, and transmitting the read signals comprises transmitting differential read signals over respective pairs of read traces.

20. The method of claim 19, wherein the interleaved arrangement of read and write traces in plural layers of the interconnect structure enables closer spacing of adjacent traces in each read trace pair and in each write trace pair, the closer spacing providing for reduced impedance of each read trace pair and each write trace pair,
wherein transmitting the differential write signals comprises transmitting differential write signals over respective write trace pairs of reduced impedance, and
wherein transmitting the differential read signals comprises transmitting differential read signals over respective read trace pairs of reduced impedance.

21. The method of claim 19, wherein transmitting the write signals comprises transmitting the write signals over pairs of write traces, each pair of write traces comprising one write trace in one layer stacked over another write trace in another layer, and
wherein transmitting the read signals comprises transmitting the read signals over pairs of read traces, each pair of read traces comprising one read trace in one layer stacked over another read trace in another layer.

22. A method comprising:
providing a tape cartridge in a tape drive comprising a tape head assembly having a transducer;
reading data from and recording data to a tape of the tape cartridge with the transducer head; and
transmitting read signals and write signals over respective read traces and write traces in an interconnect structure having plural layers of read traces and write traces, the read traces and write traces arranged in an interleaved arrangement, wherein transmitting the write signals comprises transmitting the write signals over write traces provided in a first one of the layers, and transmitting the read signals comprises transmitting the read signals over read traces provided in a second one of the layers.

* * * * *

UNITED STATES PATENT AND TRADEMARK OFFICE
CERTIFICATE OF CORRECTION

PATENT NO.       : 7,196,866 B2  
APPLICATION NO.  : 10/737938  
DATED            : March 27, 2007  
INVENTOR(S)      : Paul W. Poorman It is certified that error appears in the above-identified patent and that said Letters Patent is hereby corrected as shown below:

In column 2, line 57, delete "electically" and insert -- electrically --, therefor.

In column 4, line 28, delete "Kaptons®" and insert -- Kapton® --, therefor.

Signed and Sealed this

Second Day of September, 2008

JON W. DUDAS  
*Director of the United States Patent and Trademark Office*